(12) United States Patent
Guilley et al.

(10) Patent No.: US 10,354,064 B2
(45) Date of Patent: Jul. 16, 2019

(54) COMPUTER IMPLEMENTED METHOD AND A SYSTEM FOR CONTROLLING DYNAMICALLY THE EXECUTION OF A CODE

(71) Applicant: SECURE-IC SAS, Cesson-Sévigné (FR)

(72) Inventors: Sylvain Guilley, Paris (FR); Thibault Porteboeuf, Paris (FR)

(73) Assignee: SECURE-IC SAS, Cesson-Sévigné (FR)

( * ) Notice: Subject to any disclaimer, the term of this patent is extended or adjusted under 35 U.S.C. 154(b) by 123 days.

(21) Appl. No.: 15/317,325

(22) PCT Filed: Jun. 19, 2015

(86) PCT No.: PCT/EP2015/063880
§ 371 (c)(1),
(2) Date: Dec. 8, 2016

(87) PCT Pub. No.: WO2015/193500
PCT Pub. Date: Dec. 23, 2015

(65) Prior Publication Data
US 2017/0124322 A1    May 4, 2017

(30) Foreign Application Priority Data
Jun. 20, 2014 (EP) .................................... 14305954

(51) Int. Cl.
*G06F 21/52* (2013.01)
*G06F 21/54* (2013.01)
(Continued)

(52) U.S. Cl.
CPC ................ *G06F 21/54* (2013.01); *G06F 8/75* (2013.01); *G06F 21/566* (2013.01); *G06F 21/12* (2013.01);
(Continued)

(58) Field of Classification Search
CPC . G06F 21/52; G06F 21/54; G06F 8/75; G06F 21/566; G06F 21/12; G06F 21/6281
See application file for complete search history.

(56) References Cited

U.S. PATENT DOCUMENTS 7,721,275 B2 * 5/2010 Kestner ............... G06F 9/45516
717/154
8,046,751 B1 * 10/2011 Avadhanula ............... G06F 8/75
717/104
(Continued)

OTHER PUBLICATIONS

International Search Report and Written Opinion PCT/EP2015/063880, dated Aug. 21, 2015.
(Continued)

*Primary Examiner* — Jayesh M Jhaveri
(74) *Attorney, Agent, or Firm* — Meagher Emanuel Laks Goldberg & Liao, LLP

(57) ABSTRACT

According to the invention, there is provided a computer implemented method for controlling dynamically the execution of a code by a processing system, said execution being described by a control flow graph comprising a plurality of basic blocks composed of at least an input node and an output node, a transition in the control flow graph corresponding to a link between an output node of origin belonging to a first basic block and an input node of a second basic block, a plurality of initialization vectors being associated to the output nodes at the time of generating the code, an a priori control word being associated to each input node which is linked to the same output node of origin according the control flow graph, said a priori control word being precomputed at the time of generating the code by applying a predefined deterministic function F to the initialization vector associated to its output node of origin, the following steps being applied once the execution of the output node belonging to a first basic block is terminated and at the time
(Continued)

of executing the input node of a second basic block: providing (300) the a priori control word associated to the input node of the second basic block; providing (301) the initialization vector associated to the output node of the first basic block; determining (302) an a posteriori control word by applying to the provided initialization vector the same function F which has been used for generating the a priori control word; determining (303, 304) if the a priori control word matches with the a posteriori control word, a forbidden transition in respect to the control flow graph being otherwise detected (305).

20 Claims, 8 Drawing Sheets

(51) Int. Cl.
*G06F 21/56* (2013.01)
*G06F 21/12* (2013.01)
*G06F 21/62* (2013.01)
*G06F 8/75* (2018.01)

(52) U.S. Cl.
CPC .......... *G06F 21/52* (2013.01); *G06F 21/6281* (2013.01); *G06F 2221/033* (2013.01); *G06F 2221/034* (2013.01); *G06F 2221/2107* (2013.01); *G06F 2221/2125* (2013.01)

(56) References Cited

U.S. PATENT DOCUMENTS

| | | | |
|---|---|---|---|
| 9,965,744 B1* | 5/2018 | Jagpal | G06Q 10/10 |
| 2009/0077542 A1* | 3/2009 | Chou | G06F 8/75 |
| | | | 717/132 |
| 2011/0191760 A1* | 8/2011 | Guy | G06F 8/75 |
| | | | 717/155 |
| 2014/0013304 A1* | 1/2014 | Vangala | G06F 8/75 |
| | | | 717/123 |
| 2017/0017789 A1* | 1/2017 | Daymont | G06F 21/556 |

OTHER PUBLICATIONS

Nahmsuk, Oh et al., "Control-Flow Checking by Software Signatures", IEEE Transaction on Reliability, IEEE Service Center, Piscataway, NJ, US, vol. 51, No. 1, pp. 111-122, Mar. 1, 2002 (Mar. 1, 2002).

Namjoo, Masood—Institute of Electrical and Electronics Engineers: "Techniques for Concurrent Testing of VLSI Processor Operation", Quality Productivity Profit, Philadelphia, Nov. 15-18, 1982; [International Test Conference], Silver Spring, IEEE Comp. Sco. Press, US, vol. SYMP. 1982, Nov. 1, 1982 (Nov. 1, 1982), pp. 461-468.

Martin Abadi, et al., "Control-Flow Integrity Principals, Implementations, and Applications", ACM Transactions on Information and System Security, AMC, New York, NY, US, vol. 13, No. 1, Oct. 1, 2009 (Oct. 1, 2009), pp. 4:1-4:40.

* cited by examiner

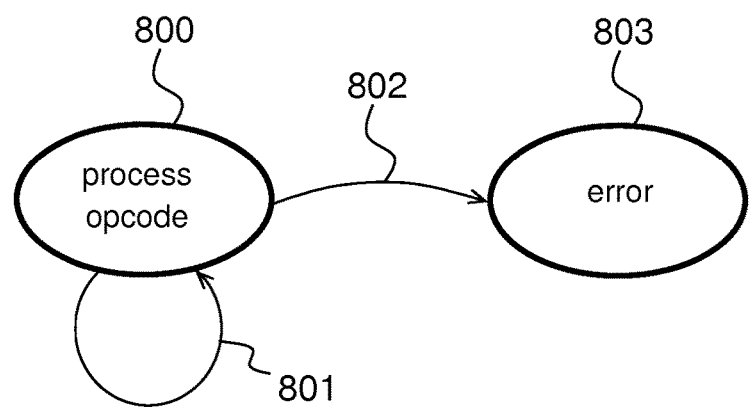
FIG.8
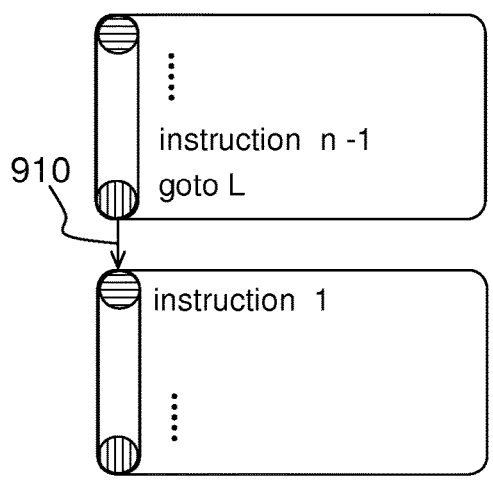
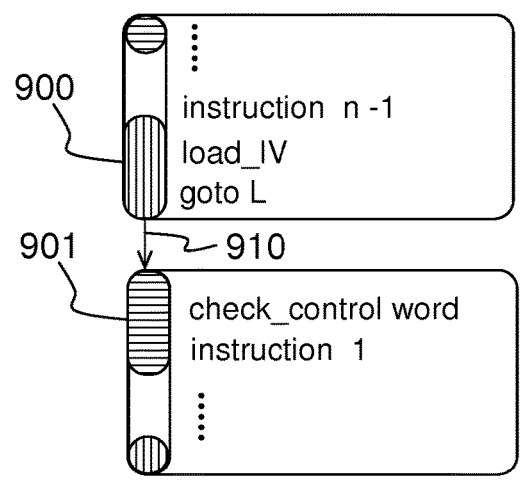
FIG.9A  FIG.9B

COMPUTER IMPLEMENTED METHOD AND A SYSTEM FOR CONTROLLING DYNAMICALLY THE EXECUTION OF A CODE

This invention relates to a computer implemented method for controlling dynamically the execution of a code, a processing system and a method for generating a code which can be executed by said processing system. The invention is particularly, but not exclusively, applicable to secured embedded systems.

Cyber attacks consist into running a software code in a way that has not been anticipated at design time.

One possibility to do so results from obvious errors (weak passwords, tricking the user into doing something bad for him, and similar techniques also called as social engineering) or poor quality software (protection with holes or backdoors for example). Protections against those vulnerabilities are often non-technical.

An alternative which can be considered to implement cyber attacks consists in bringing the program in a non-specified state by sending it crafted data. This means that the program is designed to follow a certain amount of paths, but that malevolent inputs are able to abuse the programme. This results in a hijacking of the execution flow and leads to a remote takeover. It is customary to make the distinction between the crafted user-provided data that allows deflecting the program from its intended behaviour (also referred to as the trigger) and the malicious behaviour (also referred to as the payload).

Briefly, the intimate reasons why these exploits are possible are due to a two-factor reason, namely a combination of programming language weaknesses and execution permissivity.

One typical example is the stack smashing thanks to a buffer overflow, for instance. Listing 1 is a simple C program which is used hereinafter to illustrate the principle of stack smashing.

Listing 1

```
#include <stdio.h>
void dummy( )
{
    printf("Should not be called\n");
}
void get_data(char* data)
{
    printf("Input your data:\n");
    scanf("%s",data);
}
int main( )
{
    char data[10];
    get_data(data);
    return 0;
}
```

With a specially crafted string data input by the user from outside of the program, it is possible to call function dummy( ) that is otherwise not callable from the functional control flow graph. Data will certainly contain some binary non printable characters, but this is not checked in this example.

The exploit is sketched in FIGS. 1A, 1B and 1C wherein a physical memory is represented, said memory being used as a buffer containing two distinct areas 100 and 101.

In this example, the stack 101 grows from address 0x00FF_FFFC downwards, and contains the stacking of multiple frames, a frame comprising local variables, arguments and a return address. Namely, the stack depth is equal to the depth of the functions call tree.

The program is itself in a .text segment 100, from address 0x0000_0000 upwards.

If the attacker is able to write some data in the buffer which is intended to be used by the program, then some data 103 can be written into the stack 101. In particular, the return address of a called function can be overwritten and replaced by a different address 102 chosen by the attacker (see FIG. 1A).

When the current function returns which also means that the current frame is quitted, then the processor pops the crafted return function (FIG. 1B) and branches on it (see FIG. 1C). Then, the program is executing the payload 110 of the attacker, and not the original program.

The stack is deliberately a memory area which can be freely read from and written to. Indeed, some processors are able to forbid some accesses to some given memory areas. For instance, when a MMU (Memory Management Unit) is implemented in a processing system, large portions of the RAM memory (Random Access Memory) can be set in read-only mode. This prevents for instance a program from inadvertently or malevolently overwriting constants. The .text segment 100 can also be set to read-only mode when executing it.

The stack is nevertheless a general purpose memory chunk where any access is possible, for a better convenience of the execution. Therefore, the attacker is able to corrupt the stack by illegally writing out a buffer boundaries.

Besides, the attacker can write code in the stack and then to jump on it. This strategy would even be more straightforward. However, this attack technique is easy to counteract by using state-of-the-art techniques, such as the NX bit technology. NX bit technology is described in the document entitled "Data Execution Prevention", Hewlett Packard, 2005.

Therefore, with most of the state-of-the-art processors, the attacker must inject his payload by writing only data and not machine code. As depicted before, an interesting approach for the attacker is to overwrite the return address memorized in the stack (FIGS. 1A-1C). In that case and as already explained, the program is re-routed elsewhere which means that the control flow is diverted.

Even if the execution of arbitrary code stays complex, several existing techniques allow taking advantage of this situation. For instance, return-oriented programming technique (ROP) makes possible to build a program by borrowing chunks of code from different places, especially in the legacy libraries that are linked with the program (e.g., the C library aka libc, where handy and hardly avoidable functions such as malloc are implemented).

As a summary, these state-of-the-art attacks alter the execution graph by replacing jump addresses with a forged data that will be erroneously interpreted by the processor as addresses.

Several existing protections can be used depending of the context.

Virus can be detected and then quarantined or removed by « anti-viruses » programs, that either check statistically their source code (against some portions of the binary that are renowned to be evil) or dynamically analyze their behaviors. However, anti-viruses act too late, since they detect the virus once it is already inserted in the execution system.

Other techniques allow to proactively catch the exploit when it is triggered, so as to block it "just-in-time" (JIT) that is to say red-handed. For that purpose, two strategies are usually employed.

The first strategy is called randomization. The ASLR technique (Address Space Layout Randomization) is one of them. The memory locations of program functions and data are chosen differently at each execution, and thus their addresses are not predictable. However, due to some limitations (e.g. finite length of the addresses), the ASLR can be bypassed. Also, some advanced attacks manage to execute the virus within the ASLR. Hence, this protection can be considered as weak.

A second strategy is hardening and CFI (Control Flow Integrity) is one example. CFI can be used with a static pre-processing, or dynamically (what we called "JIT"). But this solution is pure software and has therefore several shortcomings. It considerably slows down the execution of the program. Furthermore, it is itself attackable as it is a software only solution. For example, it can be bypassed if there is an exploitable bug in it.

It would be desirable to address the above issues, to develop a solution for controlling the execution of a code by a processing system.

According to the invention, there is provided a computer implemented method for controlling dynamically the execution of a code by a processing system, said execution being described by a control flow graph comprising a plurality of basic blocks composed of at least an input node and an output node, a transition in the control flow graph corresponding to a link between an output node of origin belonging to a first basic block and an input node of a second basic block, a plurality of initialization vectors being associated to the output nodes at the time of generating the code, an a priori control word being associated to each input node which is linked to the same output node of origin according the control flow graph, said a priori control word being precomputed at the time of generating the code by applying a predefined deterministic function F to the initialization vector associated to its output node of origin, the following steps being applied once the execution of the output node belonging to a first basic block is terminated and at the time of executing the input node of a second basic block:
  providing the a priori control word associated to the input node of the second basic block;
  providing the initialization vector associated to the output node of the first basic block;
  determining an a posteriori control word by applying to the provided initialization vector the same function F which has been used for generating the a priori control word;
  determining if the a priori control word matches with the a posteriori control word, a forbidden transition in respect to the control flow graph being otherwise detected.

According to one aspect of the invention, the code execution is interrupted when an output control word and an input control word belonging to two subsequent basic blocs are not identical.

For example, the second basic block is enciphered at the time of generating the code by using its associated a priori control word as a ciphering key, said method comprising the step of deciphering the second basic block by using its associated a posteriori control word as a deciphering key at the time of executing the input node of said second basic block.

According to the invention, there is also provided a processing system for executing a code comprising a processor, said system comprising also:
  a memory area configured to store the code to be executed, said code being associated to a control flow graph comprising a plurality of basic blocks composed of at least an input node and an output node, a transition in the control flow graph corresponding to a link between an output node of origin belonging to a first basic block and an input node of a second basic block, said memory area being also configured to store a plurality of initialization vectors associated to the output nodes at the time of generating the code, to store a plurality of a priori control words, an a priori control word being associated to each input node which is linked to the same output node of origin according the control flow graph, said a priori control word being precomputed at the time of generating the code by applying a predefined deterministic function F to the initialization vector associated to its output node of origin;
  an hardware implemented module configured to generate a posteriori control words, an a posteriori control word being generated for a given input node by applying to the initialization vector the same function F which has been used for generating the a priori control associated to the same input node;
  a module configured for determining if an a posteriori control and an a priori control word which are associated to the same input node are matching, a forbidden transition in respect to the control flow graph being otherwise detected.

As an example, the initialization vectors encode the nature of the jumps implementing allowed transitions in the control flow graph.

According to one aspect of the invention, the initialization vectors are memorized in the processing system using a set of dedicated registers.

According to another aspect of the invention, function F can be adapted to take into account an additional input which plays the role of an activation key.

As an example, the activation key is unique per device.

Alternatively, the activation key can be unique per program.

In one embodiment, the basic blocks are enciphered at the time of generating the code by using their associated a priori control words as a ciphering key, said system comprising a module to decipher said basic blocks at the time of executing their input node by using their associated a posteriori control word as a deciphering key.

According to the invention, there is also provided a computer implemented method for generating an improved version of an initial code intended to be executed on the processing system as described before, comprising the steps of:
  determining a control flow graph representative of an unaltered execution of the code, said control flow graph comprising a plurality of basic blocks composed of at least an input node and an output node, a transition in the control flow graph corresponding to a link between an output node of origin belonging to a first basic block and an input node of a second basic block in the control flow graph;
  generating a plurality of initialization vectors, an initialization vector being associated to each output node at the time of generating the code;

for each input node, determining an a priori control word associated to each input node which is linked to the same output node of origin according the control flow graph, said a priori control word being precomputed at the time of generating the code by applying a predefined deterministic function F to the initialization vector associated to its output node of origin;

modifying the initial code by inserting the a priori control words in line with their corresponding instructions.

The control flow diagram is determined for example through a static analysis of an initial code, said initial code being a source code.

For example, the control flow diagram is determined through a static analysis of an initial code, said initial code being an assembly code.

For example, the control flow diagram is determined through a static analysis of an initial code, said initial code being a binary code.

For example, the initialization vectors are attributed randomly.

For example, the value of an a priori control word is chosen as a function F of at least a destination address which is the address where the instruction corresponding to an input node following an output node of origin according to the control flow graph is located.

For example, the a priori control words are inserted inside the code to be executed.

For example, the a priori control words are inserted in line with the instructions corresponding to their associated input node.

For example, the initialization vectors are inserted in line with the instructions corresponding to their associated output nodes.

According to the invention, there is also provided a computer program product, stored on a computer readable medium comprising code means for causing a computer to implement the method for generating an improved version of an initial code as described before.

A better understanding of the embodiments of the present invention can be obtained from the following detailed description in conjunction with the following drawings, in which:

FIGS. 1A, 1B and 1C give an example of stack smashing thanks to a buffer overflow;

FIG. 2A is an example of control flow diagram;

FIG. 2B provides an example of a control flow diagram which is abstracted as an oriented graph containing only basic blocks;

FIG. 3 illustrates a method for controlling dynamically the execution of a code;

FIG. 4 gives an example of a representation of a control flow graph including transformed input and output nodes;

FIG. 5 illustrates an example of a processing system comprising a mechanism to control the execution of a code;

FIG. 6 provides an example of a method for generating an improved version of a code which is executable by the processing system according to the invention;

FIG. 8 illustrates the upgraded operation of the processing system in the form of a new finite state machine;

Figure 1A:
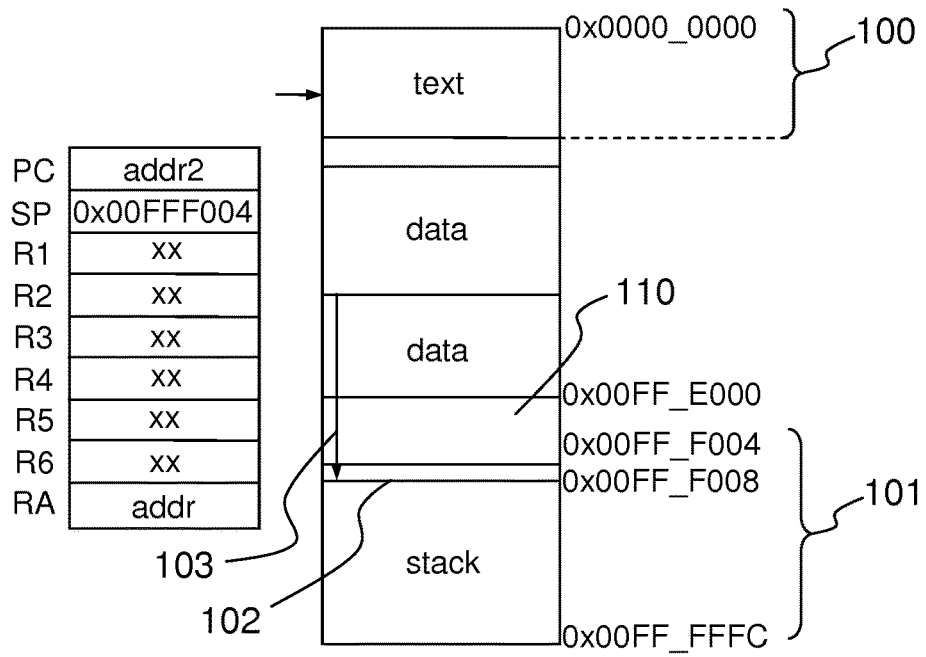
Figure 1B:
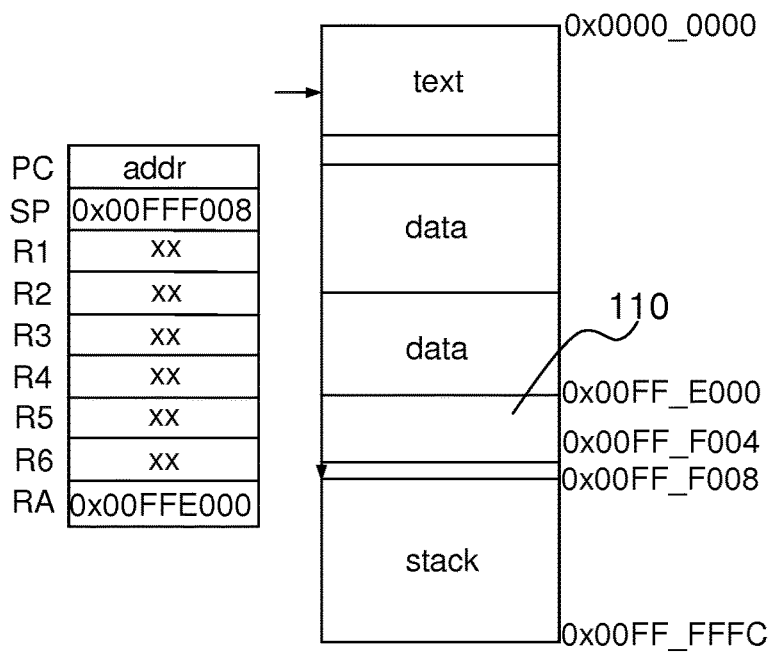
Figure 1C:
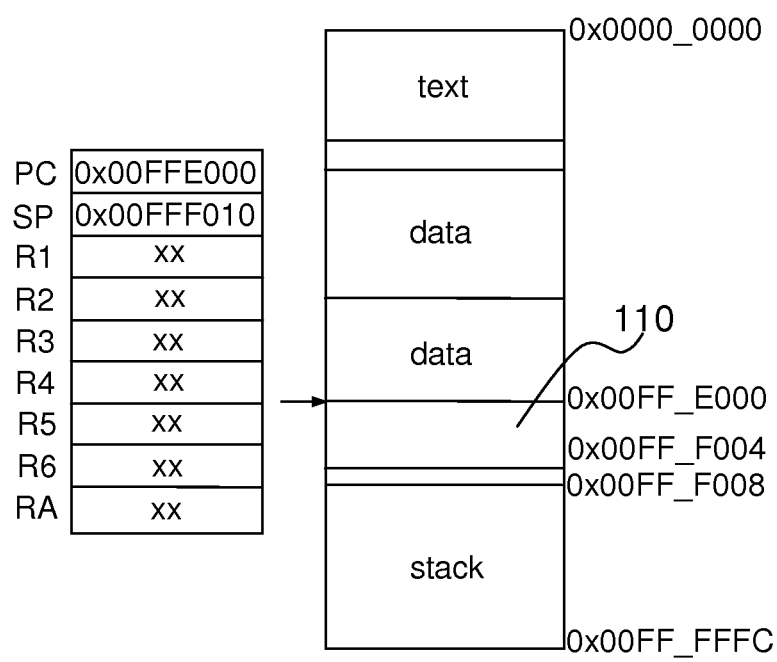

FIG. 9A provides an example of a simple control flow graph where two nodes are connected with an edge;

FIG. 9B gives an example of insertion of the initialization vector at the output node and the a priori control word and its check instruction at the other end of the edge, that is to say the input node.

In the following description, a basic block designates linear portions of code, that is to say a sequence of instructions without deviations from a straight execution.

Additionally, divergences or convergences are designating locations in the code which are corresponding respectively to the beginning and the end of a basic block. A basic block is composed of at least an input node and an output node which are representing respectively a convergence and a divergence in the control flow graph.

Moreover, the jump from the output node of a first basic block towards the input node of a second basic block is designated as a transition.

Further, the word instruction refers to an assembly line of code.

A source code can be analyzed in order to produce an oriented graph, customarily referred as the CFG (Control Flow Graph). The CFG is an oriented graph wherein each instruction is a node (or vertex) and possible sequences of instructions are indicated by the presence of an oriented edge from one node to the other.

Basic blocks correspond to linear portions of a control flow graph. In such a block, and without special instruction, the program implicitly continues to the next instruction. This means the register in the processor, which is often referred as the Program Counter (PC), is by default incremented by the size of an instruction after every instruction which is non special (i.e. non-jump).

The end of a basic block corresponds to an instruction implementing a divergence, for example:
a conditional jump, like in if, switch, while and goto constructs, "||" and "&&" binary operators, "?:" ternary operator, and also calls in function arrays;
a function call/a function return.

The difference between these two is that a function call/return it implies, in addition to the " sequence break ", the saving of some variables on the stack (referred to as a push) for a function call, and the restoration of variables on the stack (referred to as a pop). In assembly language, they also belong to kinds of opcodes: " JUMPs" and " CALLs "/" RETs". For the sake of simplicity, we refer to both sequence breaks as " jumps ".

In the scope of this invention, it is important to make a difference between statically determined jump destinations and destinations which are discovered dynamically. Several examples are provided below:
static jumps are gotos to fixed labels or function calls,
dynamic jumps are all the others.

There is a characteristic which allows differentiating dynamic jumps into two families.

A first family comprises the dynamic jumps whose possible destinations are known to belong to a finite state when the program is analyzed. Those are called direct jumps. Direct jumps are:
if, switch (at least with few cases), while, ||, &&, call of functions via an array of functions pointers;
goto to built labels (because they are necessarily within the scope of one function).

A second family comprises the other dynamic jumps which are called indirect jumps. For these jumps, the number of destinations is unknown at the compilation. Indirect jumps are:
switch (with many cases, usually >3);
return from functions that are exported, or function calls via a register (virtual functions in C++ for example).

In this description, the destination of a jump is called a label and is noted L. The destination of a function call is called as the function address and is noted &f, f being the function. It can also be noted f like in the C language. The destination of a return has no special name, but it is implicitly saved by the processor. It is a destination address.

The entrance of a basic block does not correspond to a particular assembly location. But, when compiling a program, those are known:
- for conditional jumps, as the next instruction that follows the jump instruction;
- for function calls, as the beginning of the function, and for function returns, as the instruction that directly follows the call.

A special case is for longjumps in C and exceptions in C++; in this case, the stack management is " exceptional ", as the execution flow.

A program can be associated with a control flow graph which describes all of its instructions.

Figure 2B:
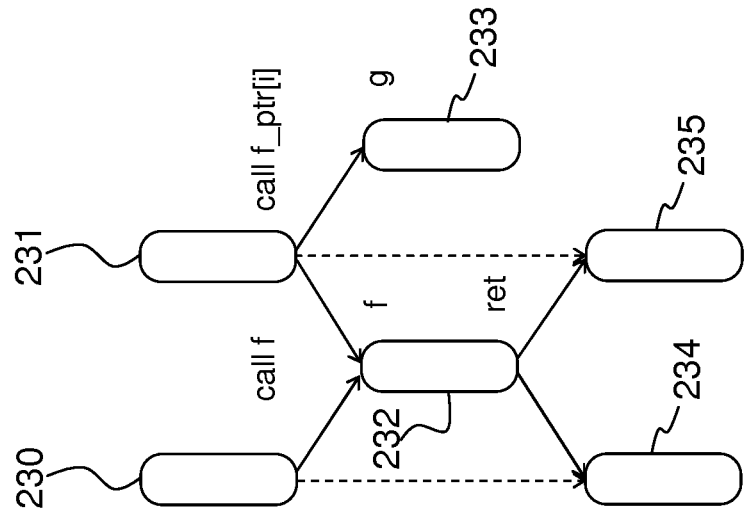
Figure 2A:
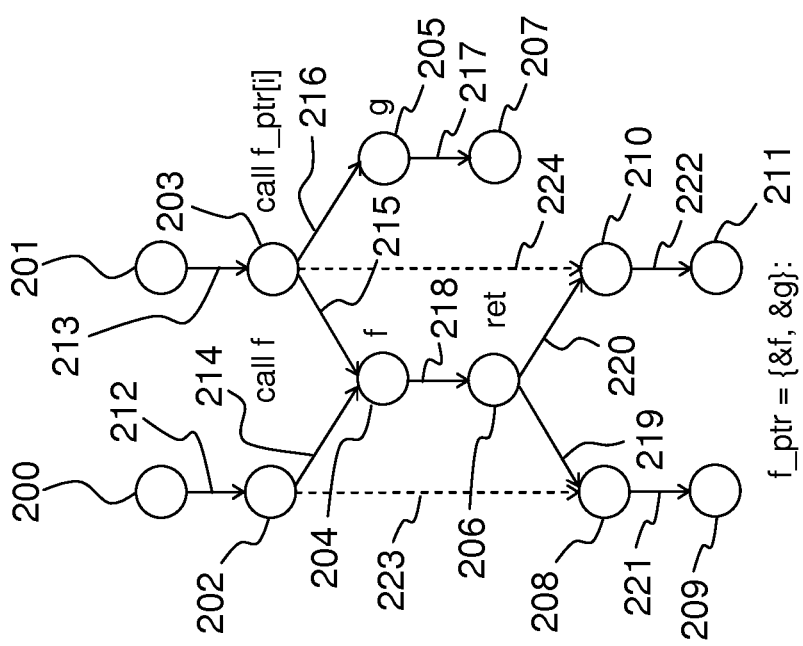

FIG. 2A is an example of control flow graph CFG. Each circle 200-211 stands for one instruction, that is to say one line in the assembly dump of the code. More precisely, the CFG is depicted by the full arrows 212-222. The dashed arrows 223, 224 represent the next instruction of a given instruction 202, 203, that allow deriving the return address in function calls.

FIG. 2B provides an example of a control flow graph which is abstracted as an oriented graph containing only basic blocks 230-235. As already mentioned, a basic block is made of one or more instructions jumping from one to the following without divergences or convergences, except for the first and the last ones. In FIG. 2B, the array of function pointers f_ptr contains the addresses of two functions, namely f and g. This representation illustrates function calls/returns but is also applicable to jumps.

Some programs are more complex since they are not monolithic, but use dynamic libraries as for example .so object files under GNU/Linux and .dll under Windows. In this case, the call between basic blocks from the main program to a dynamic library needs to pass through dedicated functions, but that can still be seen as basic blocks.

The construction of a control flow diagram can be achieved through a static analysis of the source code. It is also possible to recover the structure of a binary code. The recovery might be partial, all the more so as obfuscation techniques are employed to obscure the binary. But still, tools like IDA Pro perform quite well in this functionality and one can write its own disassembly tool.

Figure 3:
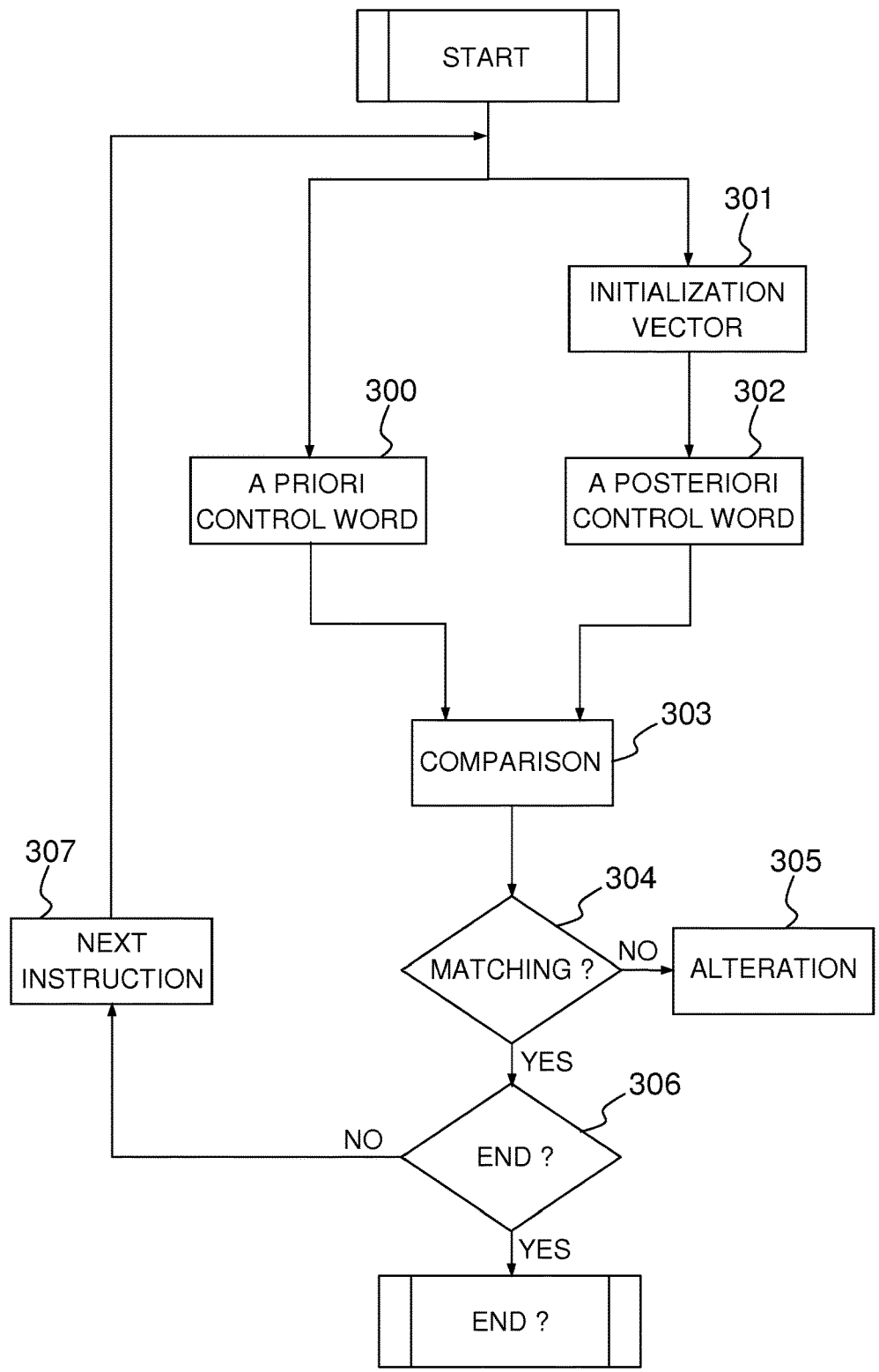
Figure 4:
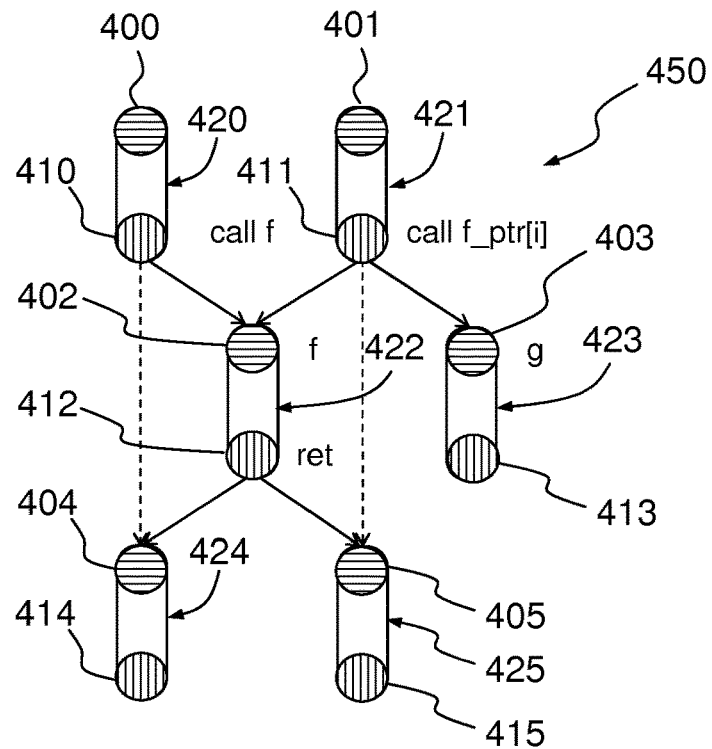

FIG. 3 illustrates a method for controlling dynamically the execution of a code and FIG. 4 gives an example of a representation of a control flow graph including input and output nodes across which the control is enforced.

This method is computer-implemented. This means that the steps (or substantially all the steps) of the method are executed by at least one processor.

The method comprises a sequence of several steps which are applied during the code execution each time a basic block execution terminates, that is to say before the execution of a subsequent instruction.

The unaltered execution of the code can be described by a control flow graph comprising a plurality of basic blocks 420-425 and edges defining allowed transitions between basic blocks. A basic block 420-425 is composed of at least an input node 400-405 and an output node 410-415 which are representing respectively a convergence and a divergence in the control flow graph. As already explained, a node corresponds to an instruction of the code to be executed such as a machine code. According to the invention, a plurality of initialization vectors is attributed to the output nodes at the time of generating the code, for example at the time of compiling a source code or at the time of analyzing an assembly code. In one embodiment, a distinct initialization vector is generated for each output node identified in the control flow graph.

The initialization vectors can be memorized into the processing system. In a preferred embodiment, the initialization vectors are memorized in the processing system using a set of dedicated registers.

The method according to the invention carries out several steps once the execution of an output node belonging to a first basic block is terminated and at the time of executing the input node of a second basic block.

A step 300 aims at providing an a priori control word associated to the input node of the second basic block. This a priori control word is precomputed at the time of generating the code by applying a predefined function F to an initialization vector, said initialization vector being associated to the output node of origin. Said differently, an allowed transition according to the control flow graph can be defined by an output node of origin which belongs to a first basic block and an input node of destination which belongs to a second basic block. Thus, an initialization vector is associated to the output node of origin and an a priori control word is associated to the input node of destination. More precisely, the a priori control word is deduced of the initialization vector associated to the output node of origin by applying function F to it.

In one embodiment, the a priori control word is inserted inside the code to be executed, for example in line with the instruction corresponding to the input node of the basic blocks.

Another step 301 aims at providing the initialization vector associated to the output node of the first basic block. As an example, this initialization vector is memorized in a dedicated register, providing this vector means reading its value for a future use.

In one embodiment, the initialization vector is inserted inside the code to be executed, for example in line with the instruction corresponding to the output node of the basic blocks.

In one embodiment, a different initialization vector is randomly attributed to output nodes for every authorized transitions or edges in the control flow graph.

In another step 302, an a posteriori control word is determined by applying the predefined function F to the provided initialization vector. According to an essential aspect of the invention, the same deterministic function F should be used for computing the a priori and the a posteriori control words associated to a given transition in the control flow graph.

An example of a deterministic function F taking an initialization vector is a SHA (Secured Hash Algorithm) cryptographic hash function of said initialization vector.

The method also comprises a step of determining 303, 304 if one of the a priori control words matches with the a posteriori control word.

If the a priori and the a posteriori control words do not match i.e. are different, an alteration 305 of the code execution is detected. More precisely, this means that a forbidden transition in respect to the control flow graph being is detected. In that case, the code execution may be interrupted.

In one embodiment, after detecting a forbidden transition in respect to the control flow graph, a security policy is enforced by triggering a hardware and/or software function.

The method according to the invention enables a hardware-assisted protection of a program from attacks that aim at re-routing the execution flow.

Advantageously, the protection is efficient in terms of security and performance-wise.

Additionally, some hardware resources such as key registers can be hidden to the attacker. Further, the verification of the control flow graph integrity cannot be bypassed as it can be encoded in a finite state machine, and the function F itself can be hardware implemented or hidden from access of a purported attacker. Another advantage is that the control can be done in parallel with the code execution which minimizes the impact on the execution speed.

Figure 5:
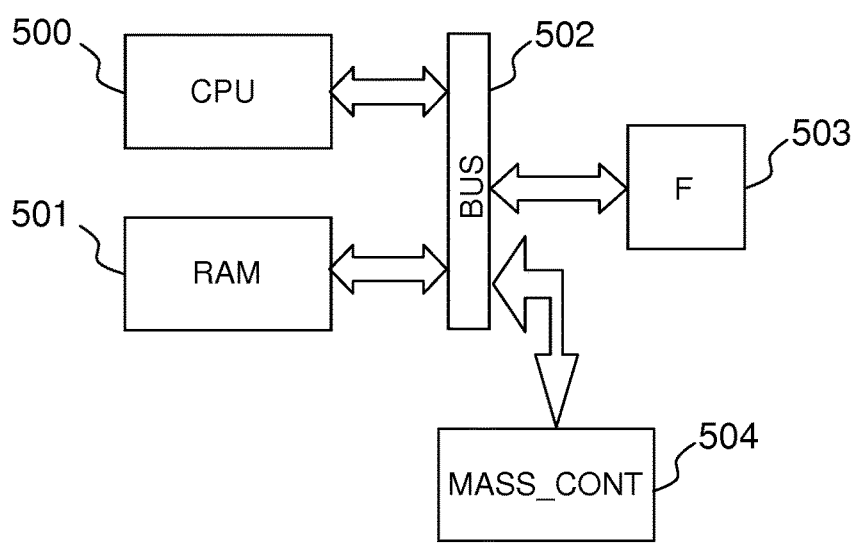

FIG. 5 illustrates a processing system comprising a mechanism to control the execution of a code.

The processing system comprises a central processing unit (CPU) 500 connected to an internal communication BUS 501, a random access memory (RAM) 502 also connected to the BUS. The processing system further comprises a mass storage device controller 504 managing accesses to a mass memory device, such as hard drive. Mass memory devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed ASICs (application-specific integrated circuits).

In one embodiment, the processing system comprises a stack stored inside the random access memory 501.

As an example, a memory area located for example in the random access memory 502 stores the code to be executed. Alternatively, a memory which is located in the mass memory device 504 can be used to store the code to be executed.

This code execution can be described by a control flow graph which comprises a plurality of basic blocks. As already mentioned, a basic block is composed of at least an input node and an output node which are representing respectively a convergence and a divergence in the control flow graph. A plurality of initialization vectors is attributed to the output nodes at the time of generating said code which means before its execution by the processing system.

The processing system also comprises a memory area wherein said initialization vectors are stored. This memory area can be a memory area which belongs to the stack of the system. Alternatively, this memory area can be implemented by adding a set of dedicated registers to the CPU 500.

The processing system also comprises a memory area wherein a plurality of a priori control words is stored. As already explained, a priori control words are precomputed at the time of generating the code. For that purpose, a predefined function F is applied to the aforementioned initialization vectors.

In one embodiment, the a priori control word is inserted inside the code to be executed, for example in line with the instruction corresponding to the input node.

Further, the processing system comprises a hardware implemented module 503 for generating a posteriori control words. An a posteriori control word is generated by applying the function F to the initialization vector which is associated to a given output node at the time of executing an instruction which follows the execution of this output node.

Additionally, the processing system comprises a module for determining if an a posteriori control word which has been calculated at the time of leaving a basic block matches an a priori control word. An alteration of the code execution is detected if the two control words do not match. This module can be either software or hardware implemented. For example, this module can be implemented by the processor 500.

Figure 6:
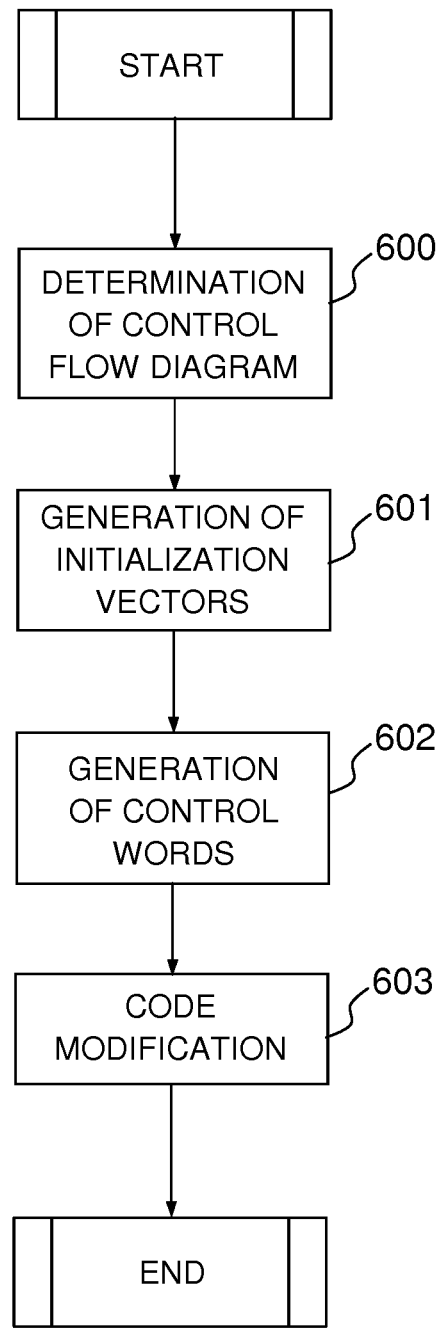

FIG. 6 provides an example of a method for generating an improved version of a code which is executable by the processing system according to the invention.

The improved code can be generated thanks to a computer implemented method which uses an initial code as an input.

A step 600 determines a control flow graph representative of an unaltered execution of the initial code. As already explained, the control flow graph comprises a plurality of basic blocks, a basic block being composed of at least an input node and an output node which are representing respectively a convergence and a divergence in the control flow graph.

The method also comprises a step 601 for generating a plurality of initialization vectors, a given initialization vector being allocated to a given output node.

Further, for each input node linked in the control flow graph to an output node associated to an initialization vector, a step 602 determines an a priori control word by applying a predefined function F to said initialization vector.

In one embodiment, for example if the code generation platform is similar to the code execution platform depicted in FIG. 5, the function F is hardware accelerated.

Then, the initial code is modified 603 in order to generate an improved version of the code by inserting the a priori control words in line with their corresponding instructions, that is to say the instructions corresponding to their associated input nodes.

In one embodiment, the modification 603 of the code also embeds initialization vectors in the improved version of the code in line with their corresponding instructions, that is to say the instructions corresponding to their associated output nodes.

In this description, a program is said to execute with an unaltered control flow diagram if it dynamically upon execution travels through the edges and nodes previously identified statically during the link and/or dynamic link processes, for example at compilation. A processing system such as a processor can typically identify at runtime divergences (that correspond for example to «jump» instructions) but has no means to identify which instruction is a licit destination. This comes from the fact that this information is not present statically in a binary code because the notion of convergence has been semantically removed after compilation.

This information is nonetheless present while compiling, and can be extracted albeit with non-trivial efforts from a dynamic analysis of the binary. The method according to the invention verifies at runtime that the CFG is unaltered.

According to the invention, binary information called control word can be added directly to a set of chosen instructions or between instructions in order to secure the association between intended departures and arrival points. This means that the .text segment 100 will slightly grow. Alternatively, the control words may be calculated on the fly.

The verification of unaltered execution ensures that no new edge is created in the control flow graph, and therefore that an attacker cannot inject new nodes. But, of course, such verification cannot check that the correct (licite) selection of vertices is made. For example, in an "if then else" statement, a program executes with an unaltered control flow graph if after the test, the program counter points either to the beginning of the "then" or of the "else" statement, and not anywhere else.

In order to keep the control flow graph execution unaltered and to prevent a drastic slow-down in the execution, a combination of new hardware and new information in the software code is implemented. Some values can be added in the binary and these values are called control words in this description. A control word is a precomputed value which is inserted statically in the binary at compile time.

Besides, the hardware is augmented to check the control words dynamically by recomputing them. This recomputation can be made mandatory, which avoids "forgetting" the verification of "warranty of legality" of one jump in the program.

The control flow graph alteration is detected unambiguously if the control words do not match across a jump, for example if they differ.

Different ways of computing control words are provided hereafter by means of examples. They are obtained by the evaluation of a function F, that can have one or more inputs, depending on the targeted security level.

A minima, it can be checked that the nature of the jump is respected, for example that it is illegal to jump at the beginning of a function from a conditional test such as an if statement. Reciprocally, it is not allowed to jump at the beginning of a basic block from a function call or return. Technically speaking, this means that the nature of the jump can be taken as an input of F while computing a control word.

However, more advanced verifications can be done. For instance, in case of a jump destination instruction wherein all the possible sources are identified, the source point can be constrained to be within the list of possible origins leading to a given destination instruction. Note that in this description, a jump destination refers to the first instruction of a basic block. Additionally, the jump destination instructions that are considered in this case include conditional jumps and even dynamic jumps, except as discussed before instructions such as return from exported function or calls to virtual functions.

This implies a notion of classes of compatible source and destination pairs, that can be enforced by initialization vectors that creates classes of matching divergences and convergences. Concretely, this means that the initialization vector is an input to the function F in charge of creating control words. The previous minimal example (the nature of jump shall impact the control word) can be seen as a special case of an initialization vector wherein the nature of the jump is implicitly converted as an initialization vector. For example:

in case of an if instruction, the initialization vector will be equal to 0x00;

in case of a call instruction, the initialization vector will be equal to 0x01;

and so on for other kind of jumps which may be encountered in the code.

According to one aspect of the invention, the value of a control word can be chosen as a function of the destination address that should be reached after a jump instruction. The advantage is that reuse and displacement of control words are impossible.

In another embodiment, the control words may depend on a key concealed in the processor. The advantage of this embodiment is that it prevents the dynamic forgery of the control words.

In another embodiment, the control words may depend on a key concealed in a segment of the code that is not readable from outside. The advantage of this embodiment is also that it prevents the dynamic forgery of the control words.

A combination of these embodiments may also be considered, which means that the F function may have two or three inputs in addition to the mandatory initialization vector.

In a processing system implementing the invention, the binary .text section 100 must be upgraded in order to embed the control words and/or the initialization vectors. They can be placed after the opcodes in line. This means that the words must be longer or that a second memory must be used as a " padding " of the first one. Alternatively, specific instructions may be used, said instructions being adapted such that:

initialization vectors are loaded before any "jump" operation;

a control word check computed knowing the current initialization vector is requested, along with the expected (a priori) control word value.

According to the invention, the initial vectors can be computed and allocated using different techniques. For instance, every parent vertex (also called output nodes) corresponding to any licit input node has identical initialization vectors attributed, so that an initialization vector depends only on the destination. This allows a graph traversal with " coloring " of vertices.

In an alternative embodiment, the parent node can dynamically compute the initialization vector or select the initialization vector in a precomputed table depending on the computed or selected destination. This implementation has the advantage of increasing the number of possible initialization vectors and thus decreasing the possibility of undetected malicious control flow hijacking.

In addition to classical registers that contain the current opcode and the current address and usually called PC (Program Counter), at least one register is added to the system. This additional register comprises the initialization vector.

In one embodiment, this initial vector can be set and reset by a specific instructions which is added to the instruction set of the processing system. We recall that the initialization vector is a piece of information that is required for the a priori and a posteriori control words (over a " jump " ) to be compatible by association.

A deterministic function F is used and designed to compute the control words. This function F is implemented in the processing system. F takes as input at least the initialization vector, which for instance encodes the nature of the opcode, that is to say: jump or not, and if jump, several sub-categories can be defined (classes of matching end points).

As previously stated, an example of a deterministic function of an initialization vector is a SHA cryptographic hash of said initialization vector.

The function F also aims at recomputing dynamically and just in time (JIT) a control word during the program execution. It is in particular automatically reevaluated if the current instruction is a jump (this can be achieved trivially in the pipeline of a processor, and is indeed most of the time already implemented, let alone to know whether the PC must be incremented [no jump] or loaded from an external value [jump]).

The result of applying the F function is a control word, that is compared with a Boolean test to the statically and read-only declared a priori control word, which can be found in the binary.

The function F can advantageously be adapted to take into account an additional input which plays the role of a key. As already mentioned, this key can be unique per device or unique per program. Alternatively, it can be unique per process, a process being an instance of a program. Using a key has the advantage to associate one binary code to one device or program or process, thereby further reducing the possibility of an attacker to fraud the protection. In that case, a second additional register is required to host the key.

So, in general, for flexibility considerations, the function F might well depends on only a subset of these arguments, depending on the expected level of verification. For example, if the association between the code and the processing system is not a requirement, the " key » input can be ignored.

The F function can be chosen as a compression function. Indeed, since the output must fit on a limited amount of bits which will generally correspond to the word size used by the system (for example 32 bits) minus the possible opcode length when the control word is introduced by an instruction in the code. This value must be large enough to avoid accidental control words equality, which happens with probability about $2^{-\#bits}$, where #bits is the control word bit-width.

The F function can be advantageously chosen so that it will be collision resistant.

Additionally, the F function can be one-way (at least for the key). That way, it will not possible to recover its arguments by knowing its output. This will advantageously protect the processing system against the recovery of the key.

Then the F function can be chosen such that it will be fast to compute, ideally in one clock cycle or with the number of clock cycles required to execute one instruction on the processing system, so as not to impede the latency.

It is also possible to add optional new opcodes. An opcode can be added to initialize/set a new initialization vector, which can be for example equal to zero by default.

Figure 7:
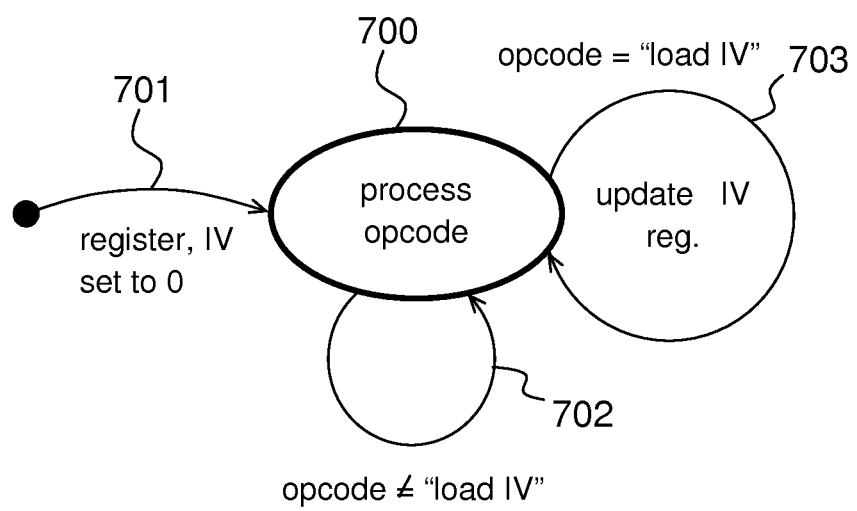
FIG. 7 shows the operation of an opcode designed to set a new initialization vector in the form of a finite state machine.

FIG. 7 shows the operation of an opcode designed to set a new initialization vector in the form of a finite state machine with one state 700 and three transitions 701-703.

An opcode can be added to request the verification of a control word, in the case this is not done by default at each clock cycle. This implicit behavior does not slow down the execution, because the control word computation and check is done in parallel with the nominal program execution.

FIG. 8 illustrates the upgraded operation of the processing system in the form of a new finite state machine with two states 800, 803 and two transitions 801, 802. The minimal condition for the control word to be checked is twofold:
 the current opcode is a jump (in the general sense, i.e. a conditional branch, a function call or return), and
 if it is a conditional branch, the jump is effective (opposed to " continue to the next instruction » ).

In case the a priori and a posteriori control words do not match after a jump, the new finite state machine enters an error state 803 which means that the control flow graph has been corrupted. In that case, several actions can be taken, for example halt the program execution and/or active some defensive countermeasures (erase some secrets from memory).

In another embodiment, the opcodes can be enciphered by a transformation function that depends on the control words. This does not impede the normal execution of the code, as the verification of the control word is necessary before executing the sequel of the code: hence the control word is readily available to decipher in real-time the arriving enciphered opcodes.

The advantage of this technique is that code injection or reuse elsewhere is rendered very chancy, if not impossible. Furthermore, if for some reason the code happens to leak out of the processing system, then it will be unintelligible, and thus impossible to reverse-engineer, for instance so as to find vulnerabilities in it.

In one embodiment, encoding the opcodes is done using a block cipher, the key being equal or derived from the control word, for example by using a hash function.

In one embodiment the block cipher is used in conjunction with cryptographic mode of operations such as ECB (Electronic Code Book), CBC (Cipher Block Chaining), PCBC (Propagating Cipher Block Chaining), CFB (Cipher Feedback), OFB (Output Feedback) and CTR (CounTeR).

In one embodiment, encoding the opcodes is done by means of a stream cipher, the key being equal or derived from the control word, for example by using a hash function.

FIG. 9A provides an example of a simple control flow graph where two nodes are connected with a vertice 910. FIG. 9B gives an example of insertion of the a priori control word and its check at the other end of the vertice 910.

In order to forbid an attacker from derouting a program by overwriting the return addresses, the control flow graph is made more robust by modifying the ends of the basic blocks, so that:
 on leaving a basic block, some value based on the possible destinations is computed. It is called a set of a priori control words;
 on entering a basic block, the precomputed control word fitting this location is checked against the control word from the incoming vertex. By design, those two values differ only if a new edge, either to an existing node or to a newly created (forged) node, has been created in the control flow graph.

The transmission of the control word can be done on the stack. The modified final instruction of the basic block 900 and the modified first instruction of the basic bloc 901 are both represented hatched subset of instructions.

For functions, a similar mechanism can be used, with in addition the push/pop of the a priori control words. This is depicted in listing 2 which shows on an example wherein transitions are verified along function calls /returns in a control flow graph.

| Listing 2 | |
| --- | --- |
| Without protection | With protection |
| Ret<br>(equivalent to:<br>    pop %eax<br>    jmp %eax+4<br>) | pop IV (deciphered)<br>ret |
| call f<br>(equivalent to:<br>    push return_address<br>    jmp f<br>) | push IV (enciphered)<br>call f |

In one embodiment the initialization vector (IV) is not pushed in the clear on the stack. Instead, it is encrypted by some function that depend on an exposed key (to avoid their retrieval) and on their address (namely % esp, to avoid replay).

In mirror, the state machine of the hardware must be upgraded, for the verification to be done automatically. This will prevent jumping at an unplausible address, that is to say inside a basic block.

The described embodiments thus allows to reactively fight cyber-attacks, i.e. malicious modifications of the computer state by the abuse of bugs in the program it runs. For instance, a cyber-attacker might guide the program into unexpected states, that is undocumented by the specification and/or unanticipated by the developer, through various mechanisms.

One example of such cyber-attacks is to have the program reach a state with corner-case arguments (e.g., negative values when the program semantics would expect only positive values). In this example, the code is too permissive, and the cyber-attacker takes advantage of this weakness. Another example is to have the program fall into a bug uncarefully left by the developer. Such bug can represent an overflow in size when reading into a buffer of characters or an overflow of values (two integers, at least one of which is provided externally, and whose sum, computed by the program, overflows to maximum value for an integer, say 232-1 or 264-1 or 0xffff . . . ff in hexadecimal notation). It should be noted that the invention also applies to many other program state corruption techniques not described herein for the sake of conciseness.

Depending on the nature of the vulnerability, the attacker can also modify the program memory, including control-flow related information with variable degree of flexibility.

This kind of threat may be addressed by the use of a specially crafted cryptographic function F, which is configured so that it cannot be forged by an attacker, according to certain embodiments. Indeed, a cyber-attacker is capable of running the program multiple times with different arguments and observe the way it reacts (legal output, crash, or not etc.). This means the cyber-attacker is adaptative, hence the properties of the above described cryptographic function F. It should be noted that in the embodiments where the cryptographic function F is hardcoded (in hardware), less computational effort is required. Further, by implementing the cryptographic function F in hardware, the attacker is deprived of the possibility of manipulating this function F. Similarly, security verifications using the function F may be implemented in hardware in order to obtain a similar advantage: the security checks cannot be tampered, disabled, modified or by-passed. It should be noted that the invention may be also applied for protection against faults other than from a "cyber" origin, such as bugs in the program (e.g., caused by problems in the compiler, which would generate an incorrect control flow graph), or even physical faults induced by a perturbation of the environment (for example, low voltage, electromagnetic injection due to bad "electro-magnetic compatibility" shield, overclocking, etc.), whether natural or triggered by an attacker.

It should be noted that the cryptographic function may be implemented according to different techniques. For example, the cryptographic function F may be implemented using a HMAC (Keyed Hash Message Authentication Code) computation of the initialization vector and a secret key stored in a hardware configuration register. The HMAC input may also comprise the jump class (call, jump, etc). Additionally, the HMAC input may also comprise the destination address.

Alternatively, the cryptographic function F may be implemented using a block cipher taking as plaintext input the initialization vector and a secret key stored in a hardware configuration register. The block cipher input may comprise the jump class (call, jump, etc), and/or the destination address. Examples of block ciphers comprise with no limitation different types of ciphering algorithms such as AES (Advanced Encryption Standard) and 3DES (DES stands for Data Encryption Standard). In particular, the block cipher may be chosen to be lightweight and fast to compute in hardware. Examples of such block ciphers comprise SMALL PRESENT and SIMON.

The function F may be also implemented by using a CBC-MAC (Cipher Block Chaining Message Authentication Code) computation of the initialization vector and a secret key stored in a hardware configuration register.

In another embodiment, the function F may be implemented using a stream cipher taking as plaintext input the initialization vector and a secret key stored in a hardware configuration register. The stream cipher input may also comprise the jump class (call, jump, etc) and/or the destination address. The stream ciphers may comprise any type of algorithm such as TRIVIUM or chained block ciphers such as AES-CBC. The stream cipher may be also chosen to be lightweight and fast to compute in hardware (like stream ciphers comprising TRIVIUM).

In still another embodiment, the function F may be implemented using a asymmetric cryptography signature of the initialization vector and a secret key stored in a hardware configuration register. The signed data may also comprise the jump class (call, jump, etc) and/or the signed data also comprises the destination address.

The processing system, methods and configurations as described above and in the drawings are for ease of description only and are not meant to restrict the apparatus or methods to a particular arrangement or process in use.

The invention claimed is:

1. A computer implemented method for dynamically controlling execution of a code, said execution being controlled using a control flow graph comprising a plurality of basic blocks, each basic block comprising at least an input node and an output node, a transition in the control flow graph corresponding to a link between an origin output node belonging to a first basic block and an input node of a second basic block, a plurality of initialization vectors being associated with the output nodes at the time of generating the code, an a priori control word being associated with each input node linked to the same origin output node according the control flow graph, said a priori control word being precomputed at the time of generating the code by applying a predefined deterministic function F to the initialization vector associated with its origin output node, the method comprising the following steps in response to the termination of the execution of the output node belonging to a first basic block, at the time of executing the input node of a second basic block:

providing the a priori control word associated with the input node of the second basic block;
    providing the initialization vector associated with the output node of the first basic block;
    determining an a posteriori control word by applying to the provided initialization vector said deterministic function F;
    determining if the a priori control word matches the a posteriori control word, and if not detecting a forbidden transition in the control flow graph.

2. The method according to claim 1, wherein the code execution is interrupted in response to determining that an output control word and an input control word belonging to two subsequent basic blocks are not identical.

3. The method according to claim 1, wherein the second basic block is enciphered at the time of generating the code by using the associated a priori control word as a ciphering key, said method comprising a step of deciphering the second basic block by using said determined a posteriori control word as a deciphering key at the time of executing the input node of said second basic block.

4. A processing system for dynamically controlling execution of a code, the system comprising a processor, wherein the system further comprises:
   a memory area configured to store code to be executed, said code being associated with a control flow graph comprising a plurality of basic blocks, each basic block comprising at least an input node and an output node, a transition in the control flow graph corresponding to a link between an origin output node in belonging to a first basic block and an input node of a second basic block, said memory area being further configured to store:
      a plurality of initialization vectors associated with the output nodes at the time of generating the code,
      a plurality of a priori control words, an a priori control word being associated with each input node linked to the same origin output node according the control flow graph, said a priori control word being precomputed at the time of generating the code by applying a predefined deterministic function F to the initialization vector associated with the origin output node;
   an hardware implemented module configured to generate a posteriori control words, an a posteriori control word being generated for a given input node by applying to the initialization vector said function F;
   a module configured to determine if an a posteriori control and an a priori control word associated with the same input node match, and if not detecting a forbidden transition in the control flow graph.

5. The processing system according to claim 4, wherein the initialization vectors encode information related to jumps implementing allowed transitions in the control flow graph.

6. The processing system according to claim 4, wherein the initialization vectors are stored in the processing system using a set of dedicated registers.

7. The processing system according to claim 4, wherein the predetermined function F is adapted to take into account an additional input representing an activation key.

8. The processing system according to claim 4, wherein the activation key is unique per device.

9. The processing system according to claim 4, wherein the activation key is unique per program.

10. The processing system to claim 4, wherein the basic blocks are enciphered at the time of generating the code by using the a priori control words associated with as a ciphering key, said system comprising a module to decipher said basic blocks at the time of executing their input node by using their associated a posteriori control word as a deciphering key.

11. A computer implemented method for generating an improved version of an initial code to be executed by a processing system, wherein the method comprises:
   determining a control flow graph representative of an unaltered execution of the code, said control flow graph comprising a plurality of basic blocks, each basic block comprising at least an input node and an output node, a transition in the control flow graph corresponding to a link between an origin output node belonging to a first basic block and an input node of a second basic block in the control flow graph;
   generating a plurality of initialization vectors, an initialization vector being associated with each output node at the time of generating the code;
   for each input node, determining an a priori control word associated with each input node linked to the same origin output node in the control flow graph, said a priori control word being precomputed at the time of generating the code by applying a predefined deterministic function F to the initialization vector associated with the origin output node;
   modifying the initial code by inserting the a priori control words in line with their corresponding instructions.

12. The method according to claim 11, wherein the control flow diagram is determined through a static analysis of an initial code, said initial code being a source code.

13. The method according to claim 11, wherein the control flow diagram is determined through a static analysis of an initial code, said initial code being an assembly code.

14. The method according to claim 11, wherein the control flow diagram is determined through a static analysis of an initial code, said initial code being a binary code.

15. The method according to claim 11, wherein the initialization vectors are attributed randomly.

16. The method according to claim 11, wherein the value of an a priori control word is further chosen as a function of at least a destination address representing the address where an instruction corresponding to an input node following an origin output node in the control flow graph is located.

17. The method according to claim 11, wherein the a priori control words are inserted inside the code to be executed.

18. The method according to claim 17, wherein the a priori control words are inserted in line with the instructions corresponding to their associated input node.

19. The method according to claim 11, wherein the initialization vectors are inserted in line with the instructions corresponding to their associated output nodes.

20. A computer program product, stored on a non-transitory computer readable medium comprising code for causing a computer to implement a method for dynamically controlling execution of a code, said execution being controlled using a control flow graph comprising a plurality of basic blocks, each basic block comprising at least an input node and an output node, a transition in the control flow graph corresponding to a link between an origin output node belonging to a first basic block and an input node of a second basic block, a plurality of initialization vectors being associated with the output nodes at the time of generating the code, an a priori control word being associated with each input node linked to the same origin output node according to the control flow graph, said a priori control word being precomputed at the time of generating the code by applying a predefined deterministic function F to the initialization vector associated with its origin output node, the method comprising the following steps in response to the termination of the execution of the output node belonging to a first basic block at the time of executing the input node of a second basic block:
   providing the a priori control word associated with the input node of the second basic block;
   providing the initialization vector associated with the output node of the first basic block;

determining an a posteriori control word by applying to the provided initialization vector said deterministic function F;

determining if the a priori control word matches the a posteriori control word, and if not detecting a forbidden transition in the control flow graph.

* * * * *